(12) United States Patent
Nathan et al.

(10) Patent No.: US 6,295,146 B1
(45) Date of Patent: Sep. 25, 2001

(54) SYSTEM AND METHOD FOR SHARING A SPARE CHANNEL AMONG TWO OR MORE OPTICAL RING NETWORKS

(75) Inventors: Sridhar Nathan; John A. Fee, both of Plano, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/006,962

(22) Filed: Jan. 14, 1998

(51) Int. Cl.[7] .................... H04B 10/20; H04B 10/08; H04J 14/00; H04J 14/02; G01R 31/08

(52) U.S. Cl. .............. 359/119; 359/119; 359/110; 359/117; 359/128; 359/161; 370/222; 370/223; 370/224

(58) Field of Search ............................. 359/110, 117, 359/119, 128, 161, 166; 370/222, 223, 224

(56) References Cited

U.S. PATENT DOCUMENTS

| 5,406,401 | * | 4/1995 | Kremer | 359/110 |
| 5,442,623 | * | 8/1995 | Wu | 370/16.1 |
| 5,717,796 | * | 2/1998 | Clendening | 385/24 |
| 5,731,867 | * | 3/1998 | Fee | 359/110 |
| 5,870,212 | * | 2/1999 | Nathan et al. | 359/119 |

* cited by examiner

Primary Examiner—Leslie Pascal
Assistant Examiner—M. R. Sedighian

(57) ABSTRACT

A system and method for sharing a spare channel among two or more optical ring networks that have a common span. A first optical cross-connect switch (OCCS) and a first OCCS controller are placed at one end of the span and a second OCCS and OCCS controller are placed at the other end of the span. The first OCCS and the first OCCS controller are coupled to a first ADM from each optical ring, and the second OCCS and the second OCCS controller are coupled to a second ADM from each optical ring. The first OCCS controller receives alarm indications from each ADM that it is coupled to that senses a ring failure. The second OCCS controller receives alarm indications from each ADM that it is coupled to that senses a ring failure. Upon receiving an alarm indication, the first OCCS controller directs the first OCCS to optically couple the ADM that originated the alarm indication to the spare channel, and the second OCCS controller directs the second OCCS to optically couple the ADM that originated the alarm indication to the spare channel.

14 Claims, 9 Drawing Sheets

| EVENT | ACTION |
|---|---|
| Failure indication received from ring element G | (1) couple 2, 6<br>(2) couple 3, 8 |
| Failure indication received from ring element F | (1) couple 3, 6<br>(2) couple 2, 8 |
| System Initiation | (1) couple 1,5<br>(2) couple 2,6<br>(3) couple 3,8<br>(4) couple 4,7 |

FIG.6B

| EVENT | ACTION |
|---|---|
| Failure indication received from ring element K | (1) couple 2, 6<br>(2) couple 3, 8 |
| Failure indication received from ring element A | (1) couple 3, 6<br>(2) couple 2, 8 |
| System Initiation | (1) couple 1,5<br>(2) couple 2,6<br>(3) couple 3,8<br>(4) couple 4,7 |

FIG.6A

SYSTEM AND METHOD FOR SHARING A SPARE CHANNEL AMONG TWO OR MORE OPTICAL RING NETWORKS

CROSS-REFERENCE TO RELATED APPLICATIONS

This patent application is related to the following commonly owned, copending U.S. utility patent applications:

1. "Self-Healing Optical Network," 09/006965 filed Jan 14, 1998 by Sri Nathan and John Fee, filed concurrently herewith and incorporated herein by reference; and
2. "System and Method for Increasing the Robustness of an Optical Ring Network," 09/006969filed Jan 14, 1998 by Sri Nathan, filed concurrently herewith and incorporated herein by reference.

BACKGROUND OF THE INVENTION

1. Field of the Invention

The present invention relates generally to optical ring networks.

2. Related Art

A self-healing optical ring network has three or more ring elements (also called nodes) connected in a logical loop. Each ring element is connected to two other ring elements by working fiber and spare fibers (also called channels). When wavelength division multiplexing (WDM) is used a working channel and a spare channel can be carried on one or more fibers. A working channel carries traffic between ring elements during a normal mode of operation. A spare channel also carries traffic between ring elements, but a spare channel only does so when one of the working channels in the ring experiences a failure.

Ring elements can include an add/drop multiplexer (ADM). An ADM can pass traffic between the ring network and other equipment such as an electrical broadband digital crossconnect switch (DXC) and line terminal equipment.

In a typical opto-electronic Synchronous Optical Network (SONET) ring network, an ADM includes a failure detection unit that detects when a channel failure has occurred. For example, an ADM detection unit will detect a channel failure if it senses a loss of signal condition. In response to detecting a failure, the ADM sends a failure indication (also known as an alarm indication) to a central network management system, and the ADM switches traffic onto a spare channel using loopback to provide ring restoration.

FIG. 1A illustrates an example self-healing optical ring network having four ring elements 102, 104, 106, and 108. In normal mode, the working channels 110, 112, 114, and 116 carry data around the ring in a single direction and the spare channels 118, 120, 122, and 124 are idle. When a failure occurs in a ring configuration, the spare channels not affected by the failure are activated and route the traffic around the fault in the opposite direction.

FIG. 1B illustrates the operation of a self-healing optical ring when working channel 110, which is designed to carry traffic between ring element A and ring element B, experiences a failure. After ring element A detects a failure in working channel 110, ring element A switches traffic arriving on working channel 116 onto spare channel 124 in the opposite direction of the traffic flow on working channel 116. Similarly, after ring element B detects a failure in working channel 110, ring element B switches traffic arriving on spare channel 120 onto working channel 112 in the opposite direction of the traffic flow on spare channel 120. In this manner, the ring self-heals upon sensing a break in the ring.

While a present-day opto-electronic SONET ring design has the advantages of simplicity and fast switching speed, it has the drawback of an inefficient spare to working capacity ratio. The spare to working capacity ratio is the ratio of the number of spare channels to the number of working channels. In opto-electronic SONET ring networks the spare to working capacity ratio is 1:1. That is, for each working channel there must be a corresponding spare channel.

A self-healing optical network is needed that retains the speed and simplicity of a self-healing SONET ring network while providing more efficient use of spare channels.

SUMMARY OF THE INVENTION

The present invention provides a self-healing optical network that retains the speed and simplicity of a self-healing optical ring network while providing more efficient use of spare channels by having two or more optical ring networks share a spare channel, thereby decreasing the spare to working capacity ratio.

According to the present invention a first optical switching unit (OSU) is optically coupled to a first ring element of a first optical ring network, and is optically coupled to a first ring element of a second optical ring network. A second OSU is optically coupled to a second ring element of the first optical ring network, and is optically coupled to a second ring element of the second optical ring network. The first OSU and second OSU are optically coupled by a spare channel that is to be shared by the first and second optical ring networks. The first OSU optically couples either the first ring element of the first optical ring network or the first ring element of the second optical ring network to the spare channel. The second OSU optically couples either the second ring element of the first optical ring network or the second ring element of the second optical ring network to the spare channel. In this manner the spare channel can be shared among two or more optical ring networks.

Additionally, according to the present invention, the first ring element of the first optical ring network and the first ring element of the second optical ring network each send messages to the first OSU. The second ring element of the first optical ring network and the second ring element of the second optical ring network each send messages to the second OSU.

In a first embodiment of the present invention, the first ring element and second ring element of the first optical ring network, upon sensing a failure within the first optical ring network, send a data message indicating the failure to the first OSU and second OSU, respectively. Similarly, the first ring element and second ring element of the second optical ring network, upon sensing a failure within the second optical ring network, send a data message indicating the failure to the first OSU and second OSU, respectively. Upon receiving a failure indication from a ring element, the first OSU optically couples that ring element to the spare channel if that ring element is not using the spare channel as a result of a failure event. Similarly, the second OSU, upon receiving a failure indication from a ring element, optically couples that ring element to the spare channel. Consequently, when a failure occurs in the first optical ring network, the spare channel will be available to the first ring, and when a failure occurs in the second optical ring network, the spare channel will be available to the second ring.

In an alternative embodiment of the present invention, the first OSU transmits a status message to each ring element optically coupled to the first OSU. The second OSU transmits a status message to each ring element optically coupled to the second OSU. A ring element optically coupled to the first OSU will transmit a data message containing a switch command to the first OSU if the ring element is not using the spare channel and the ring element senses a failure. Similarly, a ring element optically coupled to the second OSU will transmit a data message containing a switch command to the second OSU if the ring element is not optically coupled to the spare channel and the ring element senses a failure. Upon receiving a switch command, the first and second OSU optically couple the ring element that sent the switch command to the spare channel.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIGS. 6A and 6B illustrate two switching tables according to one example of the present invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention provides a system and method for sharing at least one spare channel among two or more optical ring networks, thereby providing more efficient use of spare channels.

The present invention is described in the example environment of a fiber optic communications network having two optical rings that have a common span. Description of the invention in this environment is provided for convenience only. It is not intended that the invention be limited to application in this environment. In fact, after reading the following description, it will become apparent to a person skilled in the relevant art how to implement the invention in alternative environments. In particular, it will become apparent how to implement the invention in an environment where any number of optical rings can share any number of spare channels.

Figures 1A, 1B:
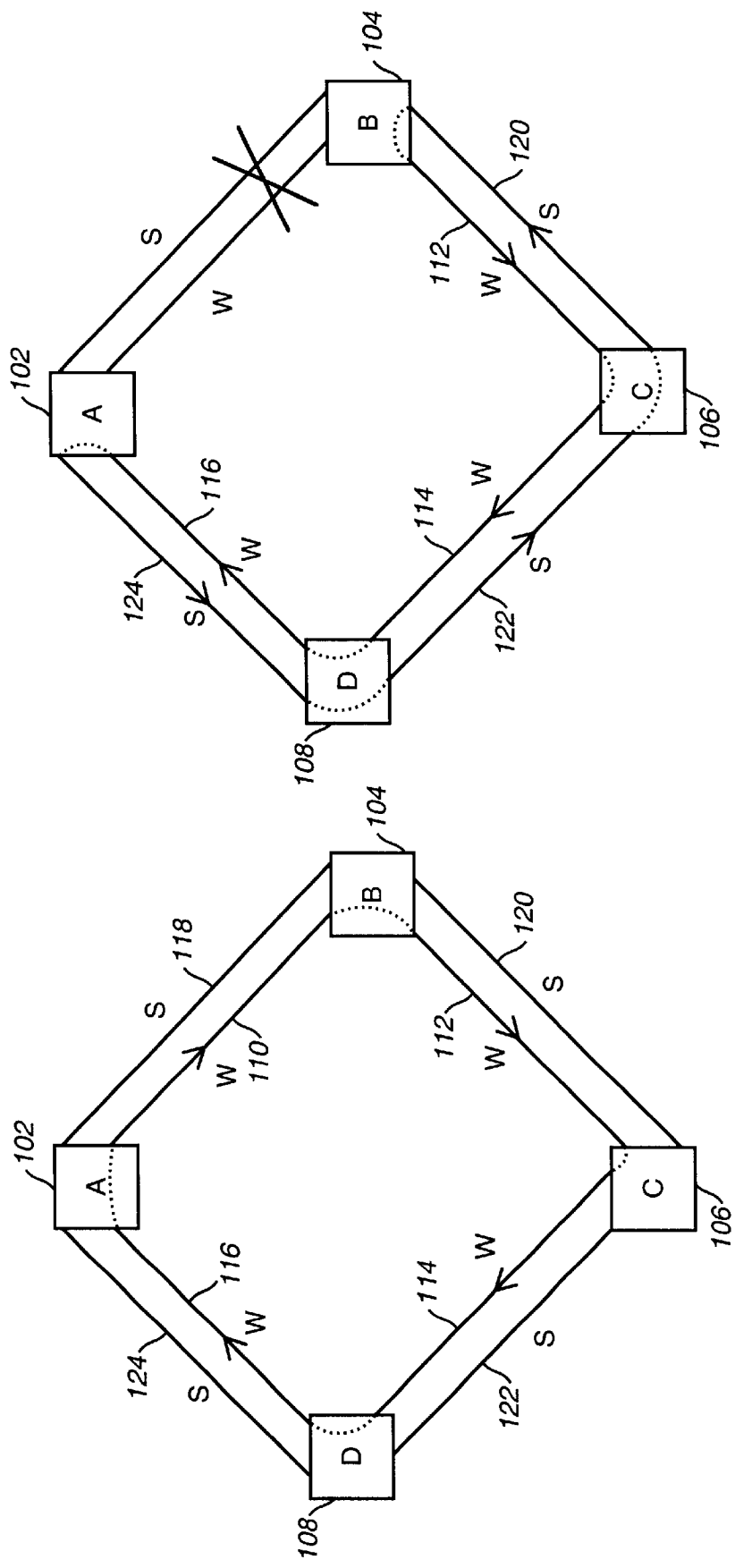
FIG. 1A is a diagram of an optical ring network in a normal mode.
FIG. 1B is a diagram of an optical ring network in a failure mode.
Figure 2:
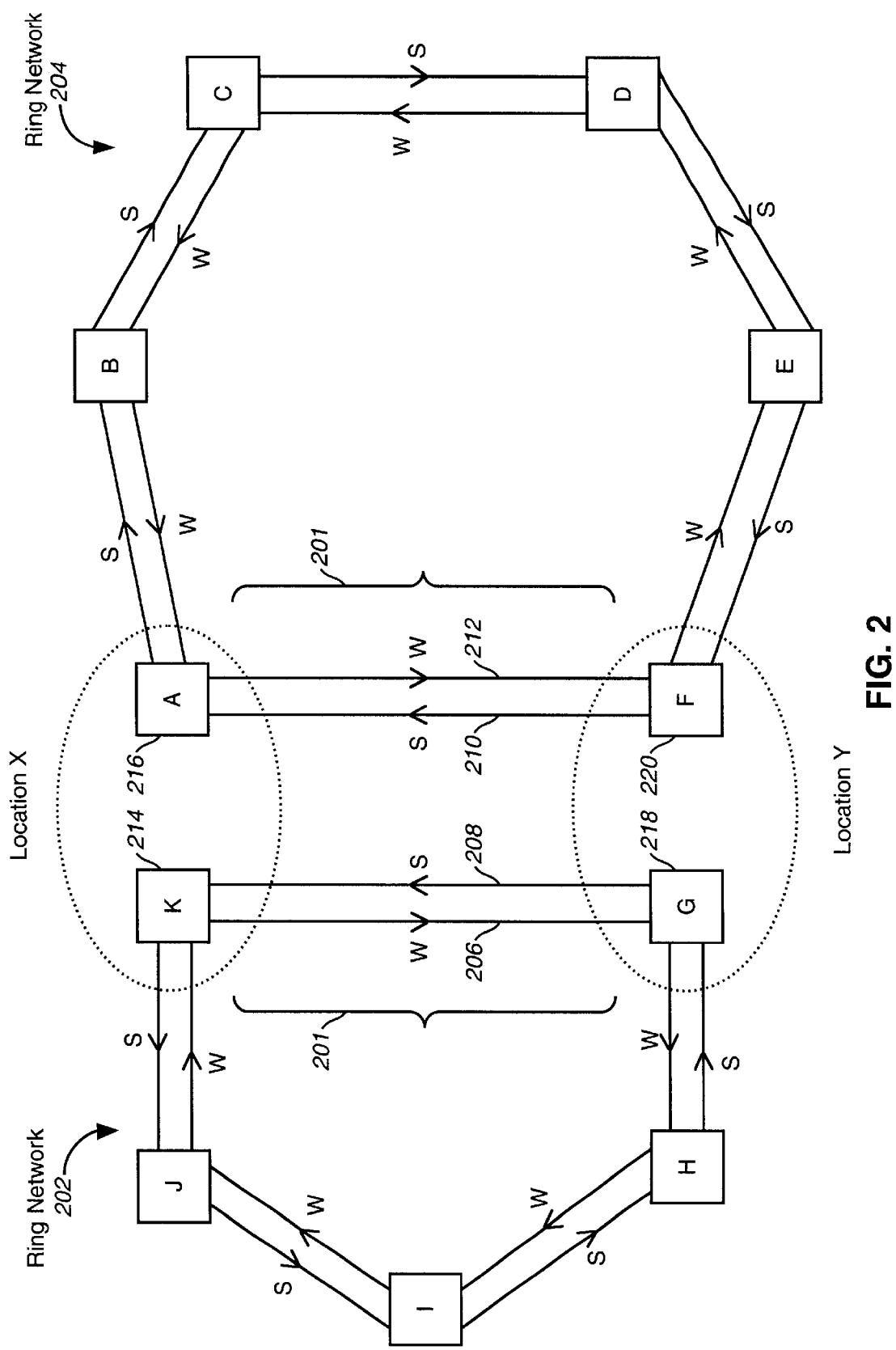
FIG. 2 is a diagram of two optical ring networks that have a common span.

FIG. 2 illustrates two optical ring networks 202 and 204 that have a common span 201. A span is a path or route between two locations. As shown in FIG. 2, ring network 202 has a ring element 214 at location X that is connected to a ring element 218 at location Y by a working channel 206 and a spare channel 208. Similarly, ring network 204 has a ring element 216 at location X that is connected to a ring element 220 at location Y by a working channel 212 and a spare channel 210.

As a result of ring network 202 and ring network 204 having a common route between location X and location Y, there are four optical communication channels 206, 208, 210, 212 connecting locations X and Y. Of the four optical communication channels 206, 208, 210, 212, two are spare channels 208, 210. Spare channel 208 serves ring network 202 and a spare channel 210 serves ring network 204.

Spare channels are idle when a ring network is in normal mode (i.e., no ring failure). Consequently, when two or more rings share a common span, idle capacity exists between a pair of locations. Prior to the present invention, 100% idle capacity was necessary to support the self-healing restoration performed independently by both ring networks 202, 204.

Figure 3:
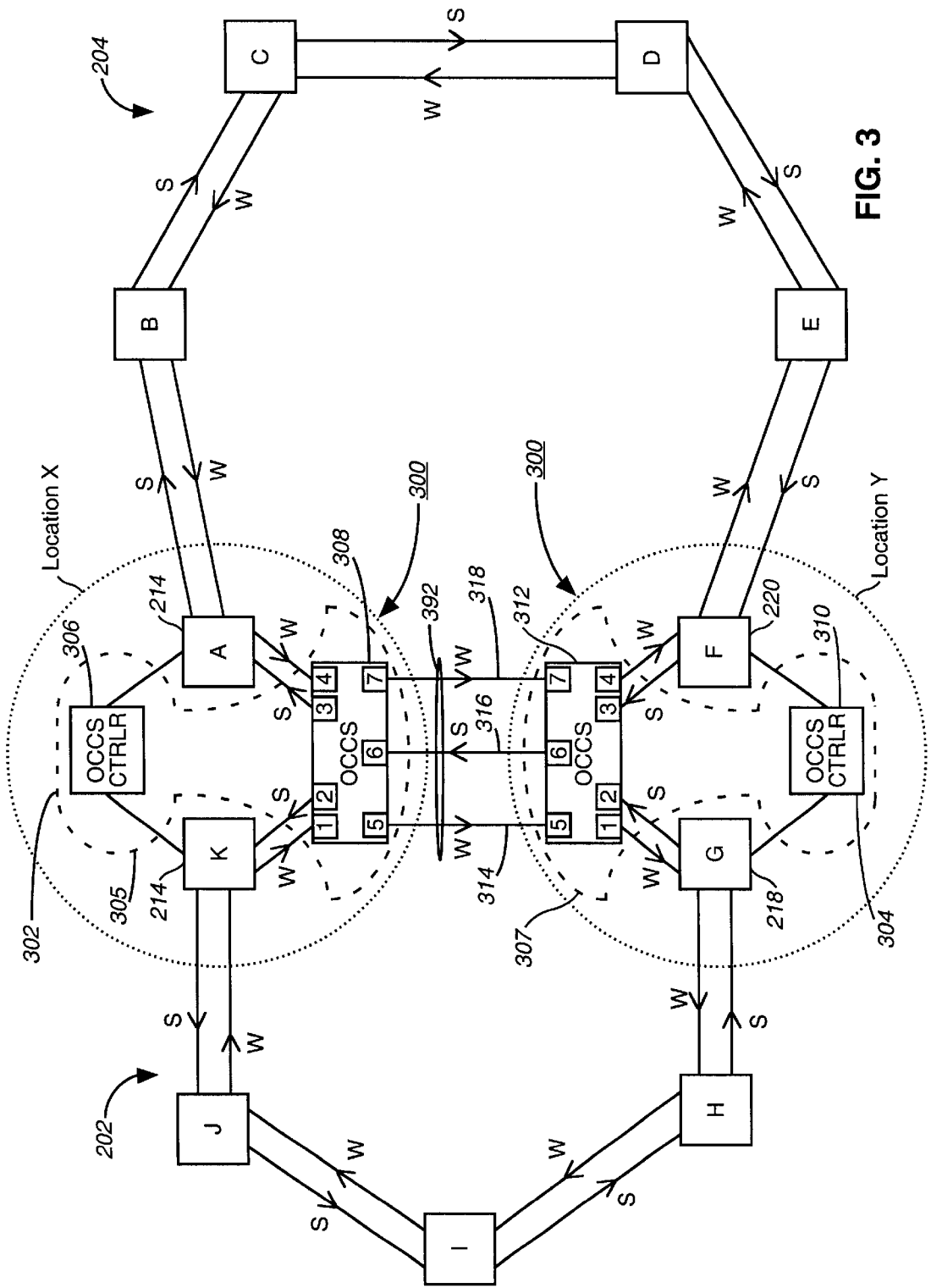
FIG. 3 is a diagram of a network configuration according to the present invention that allows two optical ring networks to share a spare channel.

FIG. 3 illustrates a network configuration 300 according to the present invention that enables ring networks 202 and 204 to share a single spare channel 316 existing between locations X and Y. A first optical switching unit (OSU) 305 is placed at location X and a second OSU 307 is placed at location Y. OSU 305 includes a first optical cross-connect switch (OCCS) 308 coupled to a first OCCS controller 306, and OSU 307 includes a second OCCS 312 coupled to a second OCCS controller 310. OCCS 308 and OCCS controller 306 can form one integral unit or can exist as two separate units coupled together such that OCCS controller 306 can transmit and receive data from OCCS 308. The same is true for OCCS 312 and OCCS controller 310.

An OCCS is a device that can switch optical paths between a plurality of optical ports. In one example, any one of the plurality of optical ports can be internally optically coupled to any other port within the OCCS.

OCCS controllers 306, 310 control the switching of OCCS 308, 312, respectively. For example, OCCS controllers 306, 310 send and receive status and switch commands to and from OCCS 308, 312, respectively. More specifically, for example, OCCS 308 and 312 receive port coupling and decoupling commands from OCCS controllers 306 and 310, respectively. A port coupling command causes an OCCS to internally optically couple a first port of the OCCS to a second port of the OCCS. A port decoupling command causes an OCCS to internally optically decouple a first port of the OCCS from a second port of the OCCS.

Figure 4:
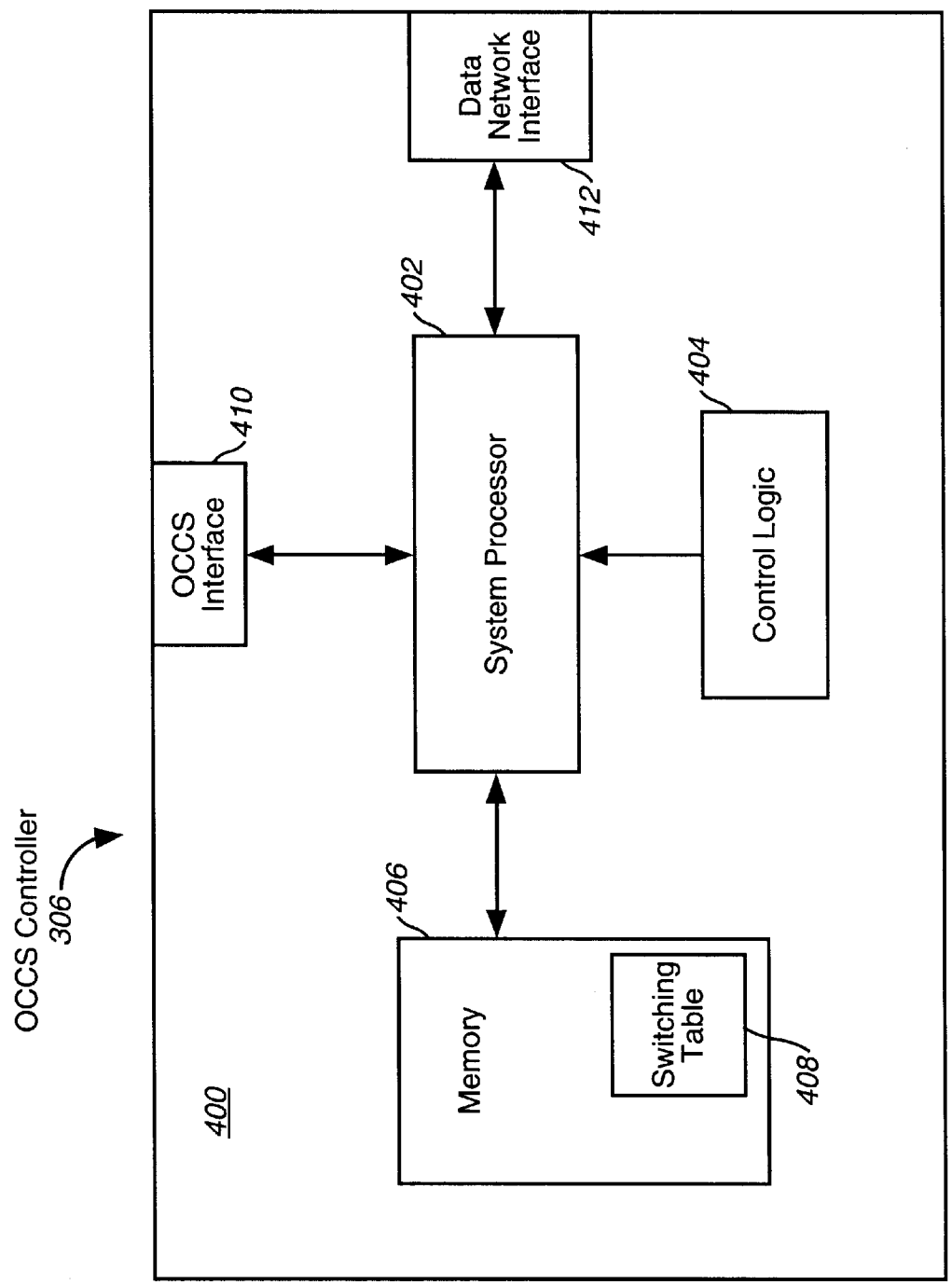
FIG. 4 is a detailed diagram showing the components of OCCS controller 306.

FIG. 4 further illustrates OCCS controller 306. OCCS controller 310 has the same configuration as OCCS controller 306. OCCS controller 306 includes a system processor 402, control logic 404 to be executed by system processor 402, memory 406 for storing the port coupling status of OCCS 308, switching table 408 being stored in memory 406, OCCS interface 410 for coupling OCCS controller 400 to an OCCS, and data network interface 412 for coupling OCCS controller 400 to a communication channel or network.

Figure 5:
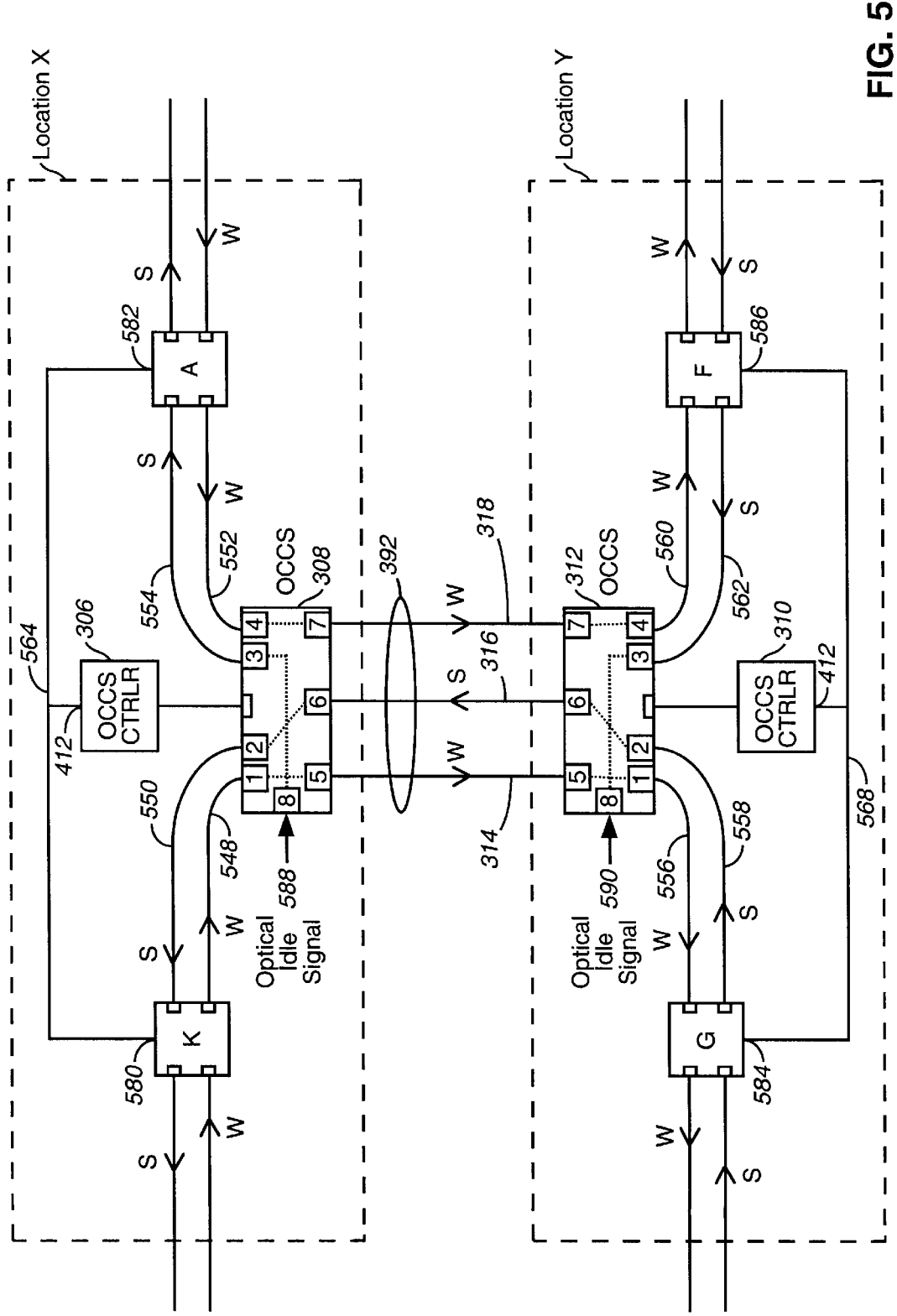
FIG. 5 is a detailed diagram of the common span portion of FIG. 3 further showing a network configuration according to the present invention that allows two optical ring networks to share a spare channel.

FIG. 5 ill the span between locations X and Y in greater detail. As shown in FIG. 5, three ports of OCCS 308 (ports 5, 6, and 7) are optically coupled to three ports of OCCS 312 (ports 5, 6, and 7) by an optical link 392. The optical communication link includes three optical channels: working channel 314, spare channel 316, and working channel 318. Specifically, port 5 of OCCS 308 is optical coupled to port 5 of OCCS 312 by working channel 314; port 6 of OCCS 308 is optically coupled to port 6 of OCCS 312 by spare channel 316; and port 7 of OCCS 308 is optically coupled to port 7 of OCCS 312 by working channel 318.

Figure 9:
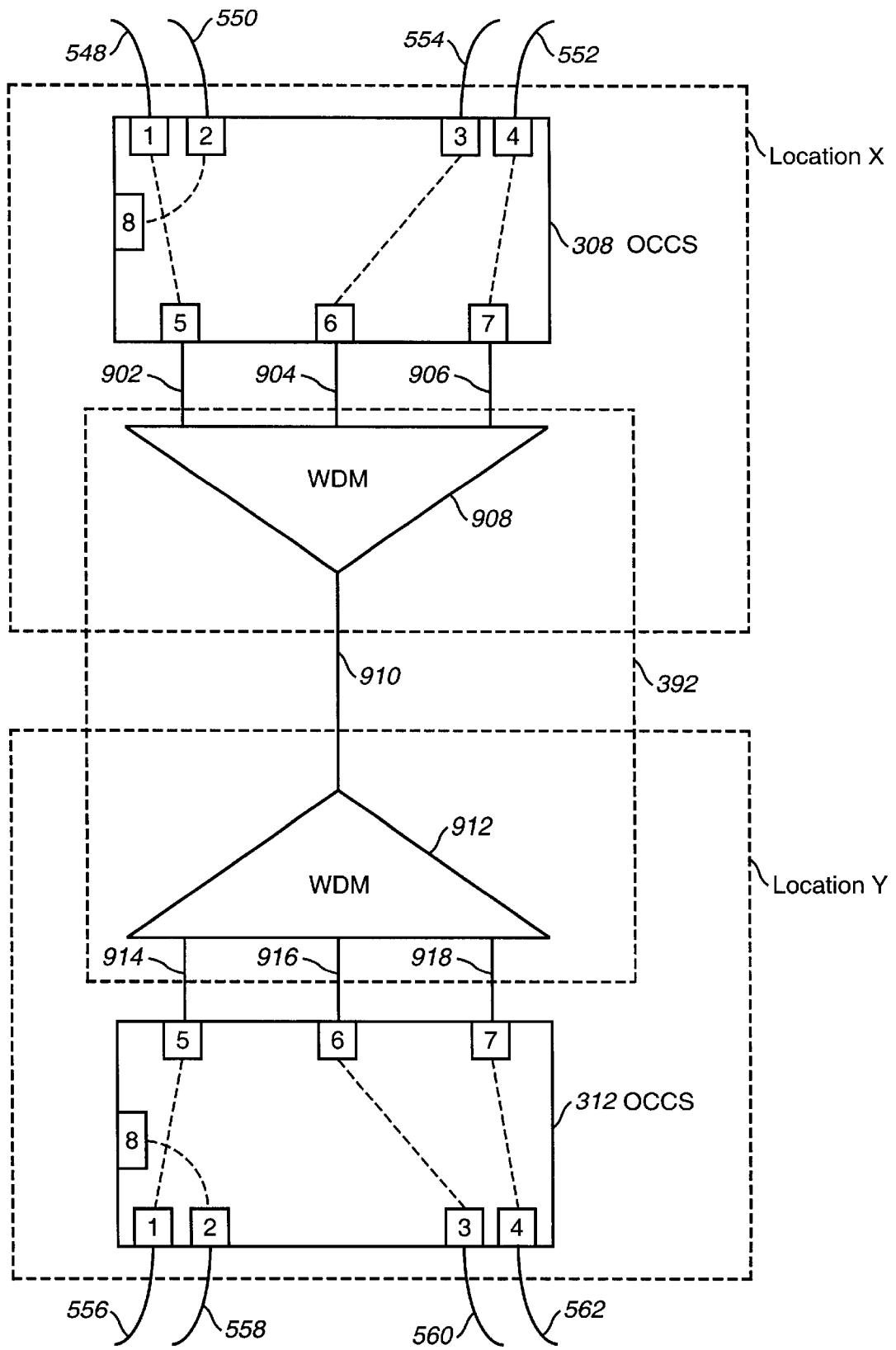
FIG. 9 is a diagram of a network configuration according to another embodiment of the present invention that allows two optical ring networks that have a common span to share a spare channel.

It should be noted that the working channels 314, 318 and spare channel 316 can exist in separate fiber optic cables as shown in FIG. 5, or they can be multiplexed onto a single fiber by wavelength division multiplexers (WDMs), as is shown in FIG. 9.

Data network interface 412 of OCCS controller 306 is coupled to network management port 582 of element A and to network management port 580 of element K by communication channel 564. Similarly, data network interface 412 of OCCS controller 310 is coupled to network management port 586 of element F and to network management port 584 of element G by communication channel 568.

In one embodiment, all ring elements are add-drop multiplexers (ADMs). After an ADM senses a ring failure, the ADM transmits a standard ring failure indication onto a communication channel connected to its network management port. Consequently, because OCCS controller 306 is coupled to the network management port of element A and element K through communication channel 564, OCCS controller 306 will receive failure indications from element A and element K. Thus, OCCS controller 306 will know if and when a failure occurs in either optical ring 202 or 204. In a similar manner, OCCS controller 310 will know if and when a failure occurs in either optical ring 202 or 204.

When ring 202 experiences a channel failure between two elements, ring 202 will not be able to self-heal unless it has a spare path between ring elements K and G. Similarly, when ring 204 experiences a channel failure between two elements, the ring will not be able to self-heal unless a spare path exists between ring elements A and F. By sharing only one spare channel between ring networks 202 and 204, unlike existing opto-electronic SONET rings, the system of the present invention creates a spare path between ring elements K and G when a failure in ring 202 occurs and creates a spare path between ring elements A and F when a failure in ring 204 occurs.

Figure 7:
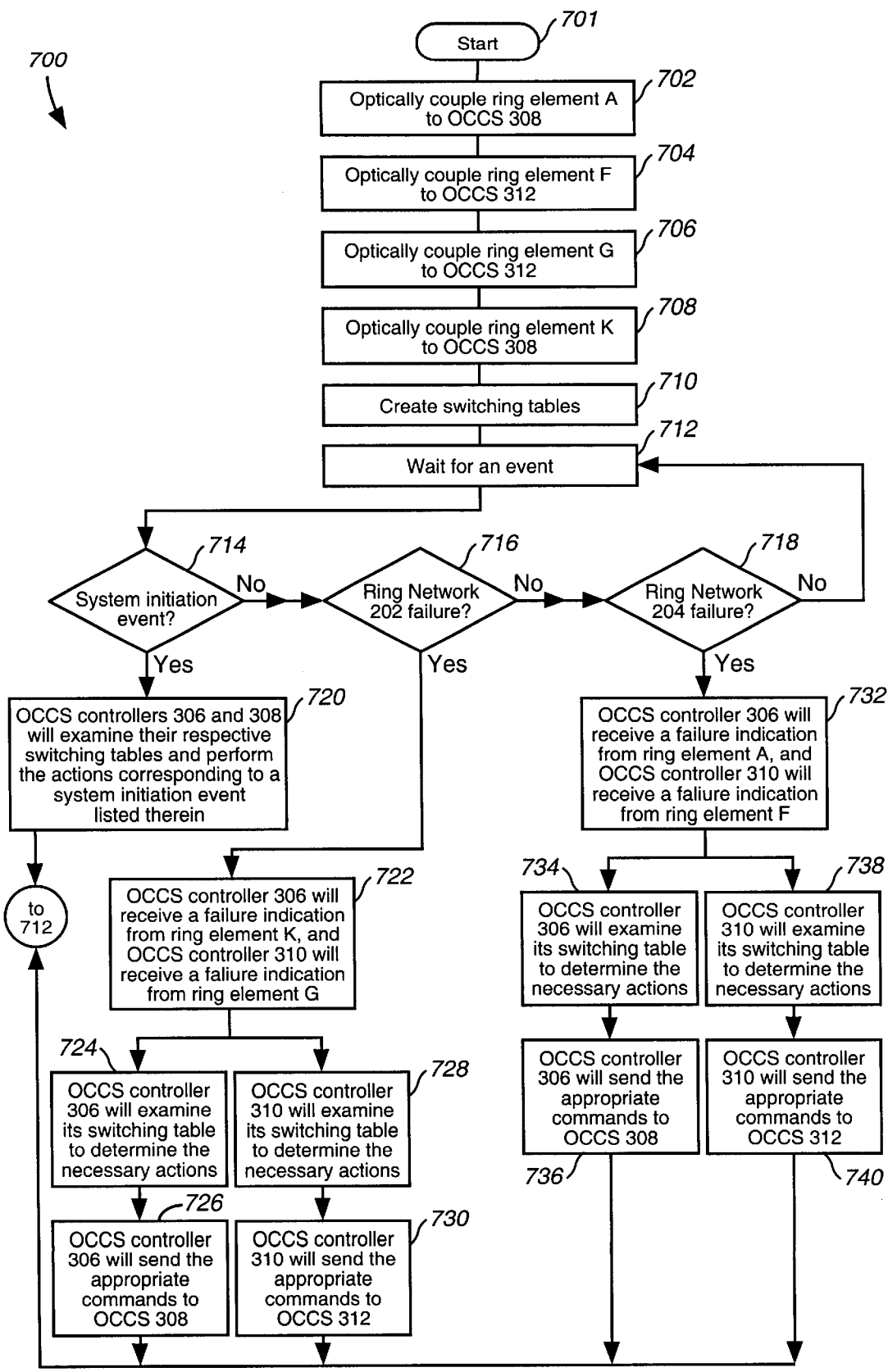
FIG. 7 illustrates a method for sharing a spare channel between the ring networks illustrated in FIG. 2 according to one embodiment of the present invention.

FIG. 7 is a flow chart illustrating method 700 for creating a spare path between ring elements K and G when a failure in ring 202 occurs and a procedure for creating a spare path between ring elements A and F when a failure in ring 204 occurs, according to one embodiment of the present invention. Method 700 is described below.

Method 700 begins at step 701 where control immediately passes to step 702. In step 702, ring element A is optically coupled to port 3 and port 4 of OCCS 308 by spare channel 554 and working channel 552, respectively. Next, ring element F is optically coupled to port 3 and port 4 of OCCS 312 by spare channel 562 and working channel 560, respectively (step 704). Next, ring element G is optically coupled to port 1 and port 2 of OCCS 312 by working channel 556 and spare channel 558, respectively (step 706). Next, ring element K is optically coupled to port 1 and port 2 of OCCS 308 by working channel 548 and spare channel 550, respectively (step 708). After step 708, control passes to step 710.

In step 710, a switching table for OCCS controllers 306 and 310 is created. Given the network configuration shown in FIG. 5, the switching table created for OCCS controller 306 will be identical to switching table 600 (see FIG. 6A) and the switching table created for OCCS controller 310 will be identical to switching table 602 (see FIG. 6B).

A switching table is a table having at least two columns, an event column 604 and an action column 606. That is, for every event that is detected by an OCCS controller, there is a corresponding course of action that the OCCS controller will take.

In one embodiment of the present invention, OCCS controllers 306 and 310 detect three events. The first event being system initiation, the second event being a channel failure in ring network 202, and the third event being a channel failure in ring network 204. As was described above, OCCS controller 306 detects a channel failure in ring network 202 and ring network 204 when OCCS controller 306 receives a failure indication from ring element K and ring element A, respectively. Similarly, OCCS controller 310 detects a channel failure in ring networks 202 and 204 when OCCS controller 310 receives a failure indication from ring element G and ring element F, respectively.

When an event is detected by an OCCS controller, the OCCS controller will consult its switching table to determine the actions it needs to take. The OCCS controller will then perform those actions.

After the switching tables are created (step 710), control passes to step 712. In step 712, OCCS controllers 306 and 310 wait for an event to occur. If a system initiation event occurs control passes to step 720 (step 714). If a channel failure in ring network 202 occurs, control passes to step 722 (step 716). If a channel failure in ring 204 occurs, control passes to step 732 (step 718).

In step 720, OCCS controllers 306 and 310 will perform the actions that correspond to a system initiation event That is OCCS controllers 306 and 310 will consult their respective switching tables to determine the actions that correspond to a system initiation event and then perform according to those actions.

As shown in FIG. 6, rows 608 and 610 of switching tables 600 and 602, respectively, contain the actions that correspond to a system initiation event. Row 608 of switching table 600 instructs OCCS controller 306 to command OCCS 308 to optically couple port 1 to port 5, port 2 to port 6, port 3 to port 8, and port 4 to port 7. Similarly, row 610 of switching table 602 instructs OCCS controller 310 to command OCCS 312 to optically couple port 1 to port 5, port 2 to port 6, port 3 to port 8, and port 4 to port 7.

As a result of the above OCCS internal port couplings, working channel 548 is optically coupled with working channel 556, thereby creating a working path between ring elements K and G. Similarly, working channel 552 is optically coupled with working channel 560, thereby creating a working path between ring elements A and F. Spare channel 550 is optically coupled with spare channel 558, thereby creating a spare path between elements K and G. Lastly, spare channel 554 is optically coupled to optical idle signal 588, and spare channel 562 is optically coupled to optical idle signal 590. This can be seen by examining FIG. 5.

It should be noted that an arbitrary choice was made to optically couple spare channel 550 with spare channel 558, thereby creating a spare path between ring elements K and G. Upon system initiation, the system would have behaved the same as if the spare path had been initially created between ring elements A and F.

It should also be noted that spare channels 554 and 562 are optically coupled to optical idle signals 588 and 590, respectively, so that ring elements A and F will not detect a failure in their respective spare channels. A person having ordinary skill in the relevant art will appreciate that there are other mechanisms for accomplishing this goal, and that the invention is not limited to using optical idle signals.

After step 720, ring networks 202 and 204 are fully functional; a working link exists between each ring element of ring network 202 and a working link exists between each ring element of ring network 204. Consequently, both ring networks can begin carrying data traffic. After step 720, control returns to step 712.

In step 722 (i.e., when a failure in ring network 202 occurs), OCCS controller 306 will receive a failure indication from ring element K over communication channel 564, and OCCS controller 310 will receive a failure indication from ring element G over communication channel 568. After step 722, control passes to step 724 and 728 in parallel.

In step 724, OCCS controller 306 will examine its switching table to determine the actions it will to take in the event of receiving a failure indication from ring element K. In this example, switching table 600 instructs OCCS controller 306 to direct OCCS 308 to: (1) optically couple port 2 to port 6; and (2) optically couple port 3 to port 8. After step 724 control passes to step 726. In step 726, OCCS controller 306 will perform those actions by sending the appropriate port coupling commands to OCCS 308.

It should be noted that if ports 2 and 3 were coupled to ports 6 and 8, respectively, prior to OCCS controller 306 sending the port coupling commands to OCCS 308, then OCCS 308 would simply ignore those port coupling commands. But if ports 2 and 3 were not coupled to ports 6 and 8, respectively, prior to OCCS controller 306 sending the port coupling commands to OCCS 308, then, after receiving the port coupling commands, OCCS 308 would first decouple ports 2 and 3 from the ports to which they were coupled.

In steps 728 and 730, OCCS controller 310 will perform the same steps described above with respect to OCCS controller 306.

After steps 726 and 730 are performed, spare channel 550 will be optically coupled to one end of spare channel 316 and spare channel 558 will be optically coupled to the other end of spare channel 316, thereby creating a spare path between ring elements K and G. After step 726 and 730, control passes back to step 712.

In step 732 (i.e., when a failure in ring network 204 occurs), OCCS controller 306 will receive a failure indication from ring element A over communication channel 367, and OCCS controller 310 will receive a failure indication from ring element F. After step 732, control passes to step 734 and 738 in parallel. Steps 734–740 are identical to steps 724–730.

Upon the completion of steps 736 and 740, spare channel 554 will be optically coupled to one end of spare channel 316 and spare channel 562 will be optically coupled to the other end of spare channel 316, thereby creating a spare path between ring elements A and F. After steps 736 and 740, control passes back to step 712.

To summarize, the above described method allows ring network 202 and ring network 204 to share spare channel 316. Spare channel 316 is used to create a spare path between ring elements A and F when ring network 204 experiences a failure, and spare channel 316 is used to create a spare path between ring elements G and K when ring network 202 experiences a failure.

Figure 8:
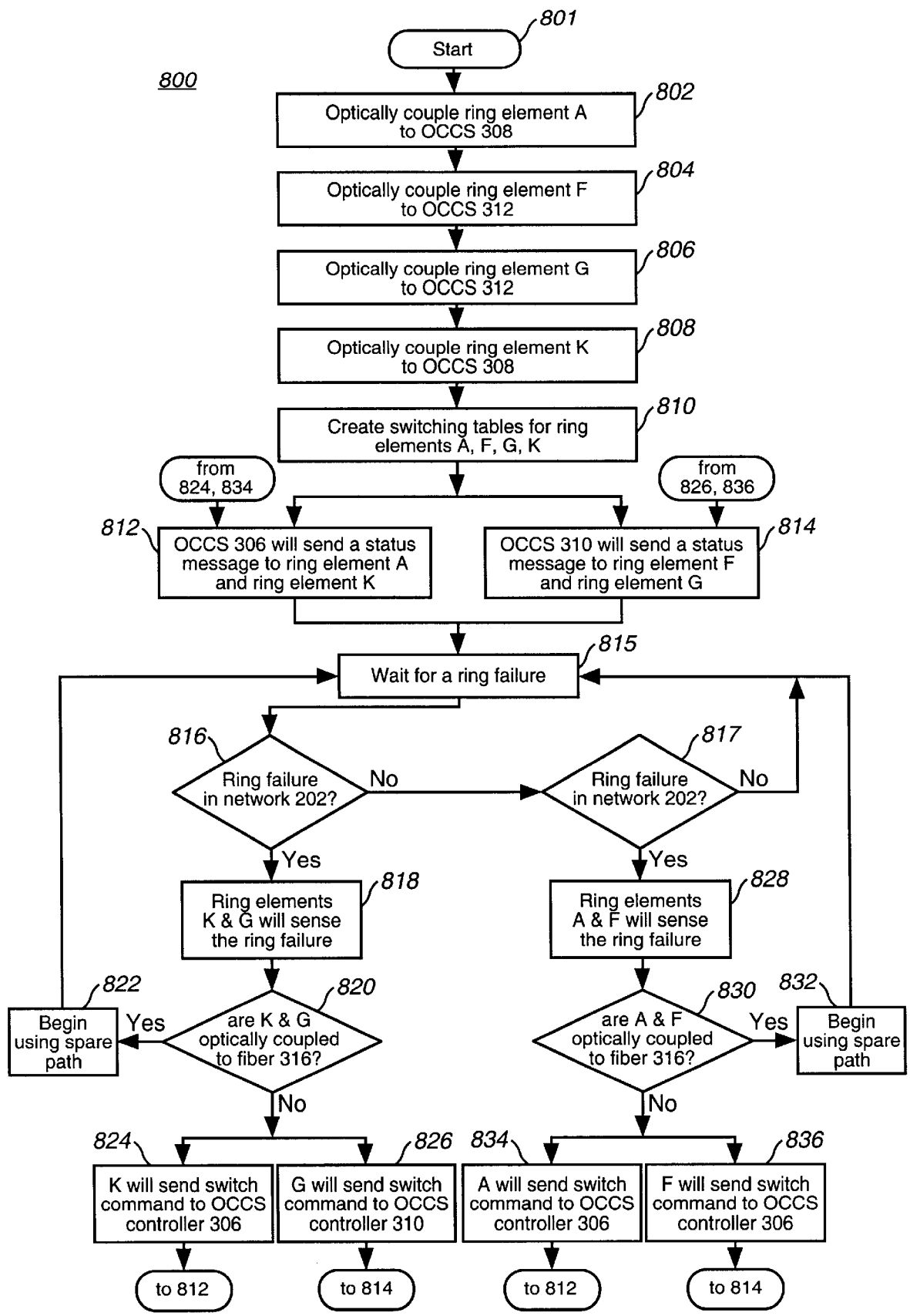
FIG. 8 illustrates a method for sharing a spare channel between the ring networks illustrated in FIG. 2 according to a second embodiment of the present invention.

In a second embodiment of the present invention, OCCS controllers 306 and 310 do not have switching tables. Instead, ring elements A, F, G, and K each have a switching table. Method 800, shown in FIG. 8, is a procedure for sharing spare channel 316 between ring networks 202 and 204 in the environment of the second embodiment. Method 800 is described below.

Method 800 begins with step 801 where control immediately passes to step 802. Steps 802–808 are identical to steps 702–708 and will not be described again here. After step 808, control passes to step 810.

In step 810, a switching table is created for ring elements A, F, G, and K. After step 810, control passes to step 812 and 814 in parallel.

In step 812, OCCS controller 306 will send two status messages over communication channel 564, one status message for ring element A and the other status message for ring element K. The status message for ring element A informs ring element A whether spare channel 554 is optically coupled to spare channel 316 (i.e., whether OCCS 308 has internally optically coupled port 3 with port 6). Similarly, the status message for ring element K informs ring element K whether spare channel 550 is optically coupled to spare channel 316 (i.e., whether OCCS 308 has internally optically coupled port 2 with port 6).

In step 814, OCCS controller 310 will send two status messages over communication channel 587, one status message for ring element F and the other status message for ring element G. The status message for ring element F informs ring element F whether spare channel 562 is optically coupled to spare channel 316. Similarly, the status message for ring element G informs ring element G whether spare channel 558 is optically coupled to spare channel 316. After step 812 and 814 control passes to step 815.

In step 815 OCCS controllers 306 and 310 wait for a ring failure to occur. If a failure occurs in ring network 202, control passes to step 818, otherwise control passes to step 828.

In step 818 ring elements K and G will sense the failure in ring network 202. In response to sensing the failure, elements K and G will use the status message that they have received from OCCS controller 306 and OCCS controller 310, respectively, to determine if they are optically coupled to spare link 316 (step 820). If elements K and G are already optically coupled to spare link 316, then elements K and G will use spare channel 550 and 558, respectively (step 822). However, if element K is not optically coupled to spare link 316, then element K will consult its switching table and, based on the contents of the table, send a switch command to OCCS controller 306 over communication channel 564. The switch command will direct OCCS controller 306 to issue a command to OCCS 308 so that element K will be optically coupled to spare channel 316 (step 824). Similarly, if element G is not optically coupled to spare link 316, element G will consult its switching table and, based on the contents of the table, send a switch command to OCCS controller 310 over communication channel 568. The switch command will direct OCCS controller 310 to issue a command to OCCS 312 so that element G will be optically coupled to spare channel 316 (step 826).

Elements A and F follow the same procedure as elements K and G in the event of a ring failure in ring 204 (steps 828–936). After steps 826 and 836 control passes back to step 812.

By using the above procedure, a spare path operating between ring elements K and G will be created when a failure in ring 202 occurs, and a spare path between ring elements A and F will be created when a failure in ring 204 occurs. In this manner, ring 202 and 204 share the spare channel 316.

FIG. 9 illustrates another alternative embodiment of the present invention. As shown in FIG. 9, optical link 392, which is used to optically couple OCCS 308 and OCCS 312, includes wavelength division multiplexer (WDM) 908 and WDM 912 connected between OCCS 308 and OCCS 312. WDM 908 and WDM 912 are optically coupled by fiber 910. WDM 908 is optically coupled to ports 5, 6, and 7 of OCCS 308 by working channel 902, spare channel 904, and working channel 906, respectively. Similarly, WDM 912 is optically coupled to ports 5, 6, and 7 of OCCS 312 by working channel 914, spare channel 916, and working channel 918, respectively. This alternative embodiment (adding WDMs) functions exactly the same as the preferred embodiment. In other words, switching tables 600 and 602 and methods 700 and 800, as described above, also apply to this WDM embodiment of the present invention as would be apparent to a person skilled in the relevant art.

While various embodiments of the present invention have been described above, it should be understood that they have been presented by way of example, and not limitation. It will be understood by those skilled in the art that various changes in form and detail may be made therein without departing from the spirit and scope of the invention as defined by the following claims. Thus the breadth and scope of the present invention should not be limited by any of the above-described exemplary embodiments, but should be defined only in accordance with the following claims and their equivalents.

What is claimed is:

1. An optical communications system having a first optical ring network and a second optical ring network, wherein the first optical ring network has a first ring element and a second ring element, and wherein the second optical ring network has a first ring element and second ring element, comprising:

a first optical cross-connect switch coupled to a first controller, controller including a first switching table, said first switching table having an event column and an action column, and optically coupled to the first ring element of the first optical ring network and to the first ring element of the second optical ring network, said first controller including first receiving means for receiving failure indications from the first ring element of the first optical ring and from the first ring element of the second optical ring;

a second optical cross-connect switch coupled to a second controller optically coupled to the second ring element of the first optical ring network and to the second ring element of the second optical ring network, said second controller including second receiving means for receiving failure indications from the second ring element of the first optical ring and from the second ring element of the second optical ring; and a spare channel optically coupled between said first optical switching unit and said second optical switching unit, wherein the first ring element of the first optical ring transmits a first ring failure indication to said first controller upon the first ring element of the first optical ring sensing a ring failure in the first optical ring, and the second ring element of the first optical ring transmits a second ring failure indication to said second controller upon the second ring element of the first optical ring sensing a ring failure in the first optical ring;

said first optical switching unit selectively optically couples one of the first ring element of the first optical ring and the first ring element of the second optical ring to said spare channel; and said second optical switching unit selectively optically couples one of the second ring element of the first optical ring and the second ring element of the second optical ring to said spare channel.

2. The system of claim 1, wherein said first controller consults said first switching table upon receiving said first ring failure indication.

3. The system of claim 2, wherein said first controller sends a command corresponding to an action in said first switching table to said first optical cross-connect switch after consulting said first switching table.

4. The system of claim 3, wherein said second optical switching unit includes a second switching table, said second switching table having an event column and an action column.

5. The system of claim 4, wherein said second controller consults said second switching table upon receiving said second ring failure indication.

6. The system of claim 5, wherein said second controller sends a command corresponding to an action in said second switching table to said second optical cross-connect switch after consulting said second switching table.

7. The system of claim 1, wherein the first ring element of the first optical ring is an add-drop-multiplexer.

8. The system of claim 1, wherein said first optical switching unit sends status information to the first ring element of the first optical ring.

9. The system of claim 8, wherein the first ring element of the first optical ring transmits a switch command to said first optical switching unit when the first ring element of the first optical ring senses a ring failure and when said status information indicates that said spare channel is not optically coupled to the first ring element of the first optical ring.

10. The system of claim 1, wherein said first optical switching unit is connected to said second optical switching unit by an optical link.

11. The system of claim 10, wherein said optical link includes a spare fiber optic cable, said spare fiber optic cable connecting a first port of said first optical switching unit with a first port of said second optical switching unit, wherein said spare fiber optic cable carries said spare channel.

12. The system of claim 10, wherein said optical link includes first and second wavelength division multiplexers (WDMs), wherein said first WDM is connected to said second WDM by a fiber optic cable, said fiber optic cable carrying said spare channel.

13. A method for sharing a spare channel between a first and a second optical ring, wherein the first optical ring has a first ring element and a second ring element, the second optical ring has a first ring element and second ring element, the first ring element of the first optical ring and the first ring element of the second optical ring being optically coupled to a first optical cross-connect switch, the second ring element of the first optical ring and the second ring element of the second optical ring being optically coupled to a second optical cross-connect switch, and the spare channel optically coupling the first and second optical cross-connect switches, the method comprising the steps of:

(a) receiving a first failure indication from one of the first ring element of the first optical ring and the first ring element of the second optical ring;

(b) optically coupling the first ring element of the first optical ring with the spare channel if the first ring element of the first optical ring transmitted the first failure indication including consulting a first switching table and sending a switch command corresponding to an action in said first switching table to the first optical cross-connect switch;

(c) optically coupling the first ring element of the second optical ring with the spare channel if the first ring element of the second optical ring transmitted the first failure indication;

(d) receiving a second failure indication from one of the second ring element of the first optical ring and the second ring element of the second optical ring;

(e) optically coupling the second ring element of the first optical ring with the spare channel if the second ring element of the first optical ring transmitted the second failure indication; and (f) optically coupling the second ring element of the second optical ring with the spare channel if the second ring element of the second optical ring transmitted the second failure indication.

14. The method of claim 13, wherein step (e) includes the steps of consulting a second switching table and sending a switch command corresponding to an action in said second switching table to the second optical cross-connect switch.

* * * * *